United States Patent
Huang

(10) Patent No.: US 8,454,864 B2
(45) Date of Patent: Jun. 4, 2013

(54) METHOD FOR MAKING MOLD FOR FORMING ANTI-FLARE LENS

(75) Inventor: Chien-Feng Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 255 days.

(21) Appl. No.: 12/977,075

(22) Filed: Dec. 23, 2010

(65) Prior Publication Data

US 2012/0038072 A1    Feb. 16, 2012

(30) Foreign Application Priority Data

Aug. 12, 2010    (TW) ................. 99126846 A

(51) Int. Cl.
*B29D 11/00*    (2006.01)
(52) U.S. Cl.
USPC .......................................... 264/2.5; 425/808
(58) Field of Classification Search
USPC ....... 264/1.1, 1.7, 2.5, 2.7, 138, 219; 425/808
See application file for complete search history.

(56) References Cited

U.S. PATENT DOCUMENTS 7,406,223 B2 * 7/2008 Ito .................................... 385/33
7,672,064 B2 * 3/2010 Sakaki .......................... 359/738

* cited by examiner

*Primary Examiner* — Mathieu D. Vargot
(74) *Attorney, Agent, or Firm* — Altis Law Group, Inc.

(57) ABSTRACT

The present disclosure relates to a method for making a mold for forming an anti-flare lens. The lens includes an optically active part and an optically inactive part. In the method, a mold core blank having a bottom surface and a top surface, is provided. The bottom surface is machined into a first surface portion, a second surface portion, and an annular surface portion. The second surface portion is located at a center of the mold core blank. The annular surface portion connects the second surface portion and the first surface portion. The first surface portion is roughened to form a roughened molding surface for forming the optically inactive part. The second surface portion is precisely machined to form a smooth molding surface for forming the optically active part. The annular surface is precisely machined to form a smooth transition surface.

7 Claims, 6 Drawing Sheets

METHOD FOR MAKING MOLD FOR FORMING ANTI-FLARE LENS

BACKGROUND

1. Technical Field

The present disclosure relates to a method for making a mold for forming an anti-flare lens.

2. Description of Related Art

Camera modules are in widespread use in electronic devices such as digital cameras, cell phones, and the like. A camera module typically includes a plurality of lenses and an image sensor.

In a typical fabrication method for a lens, a mold core is obtained by precise machining, and then the mold core is used to form lenses by injection molding. The mold core includes a first molding surface for forming an optically active part of the lens, and a second molding surface for forming an optically inactive part of the lens.

In the typical fabrication method, a substantially perpendicular surface is likely to form in the mold core between the first molding surface and the second molding surface. The lens formed using the mold core also includes a substantially perpendicular surface corresponding to the perpendicular surface of the mold core. The perpendicular surface of the lens reflect almost all light incident thereon to the image sensor of the camera module, thus causing flare on images captured by the image sensor.

Therefore, it is desirable to provide a fabrication method for an anti-flare lens, which can overcome the above-mentioned limitations.

DETAILED DESCRIPTION

Figure 1:
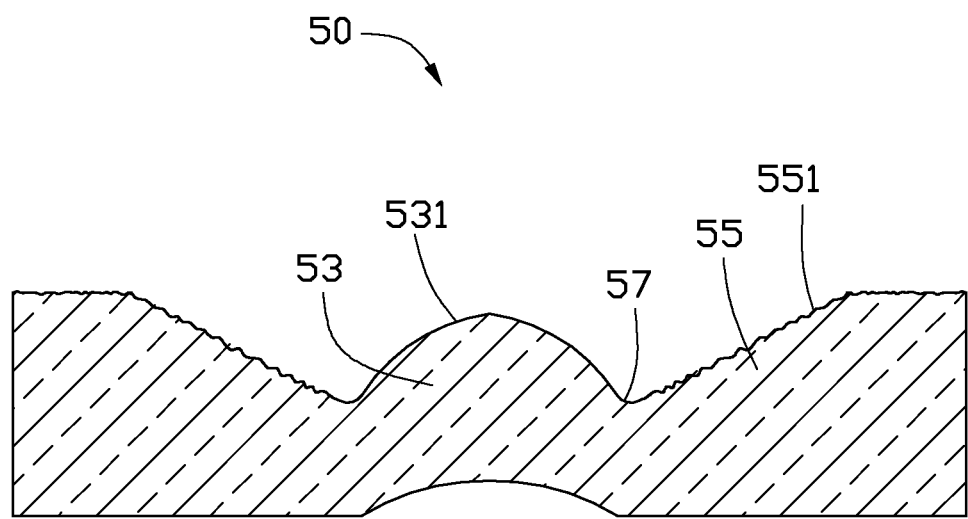
FIG. 1 is a cross-section of an anti-flare lens fabricated by a mold produced using a method as disclosed.

Referring to FIG. 1, an anti-flare lens 50 fabricated by a method as disclosed includes a central optically active part 53, a periphery optically inactive part 55 surrounding the optically active part 53, and a transition part 57 smoothly connecting the optically active part 53 and the optically inactive part 55. The optically active part 53 includes a substantially spherical smooth surface 531. The optically inactive part 55 includes a rough surface 551.

The transition part 53 is curved in cross-section. When the lens 50 is used in a camera module (not shown), light incident on a surface of the transition part 53, are uniformly scattered by the transition part 53, thus avoiding too much light reflected to an image sensor of the camera module. Accordingly, flare in the camera module is decreased/eliminated.

A fabrication method for the lens 50 follows.

Figure 2:
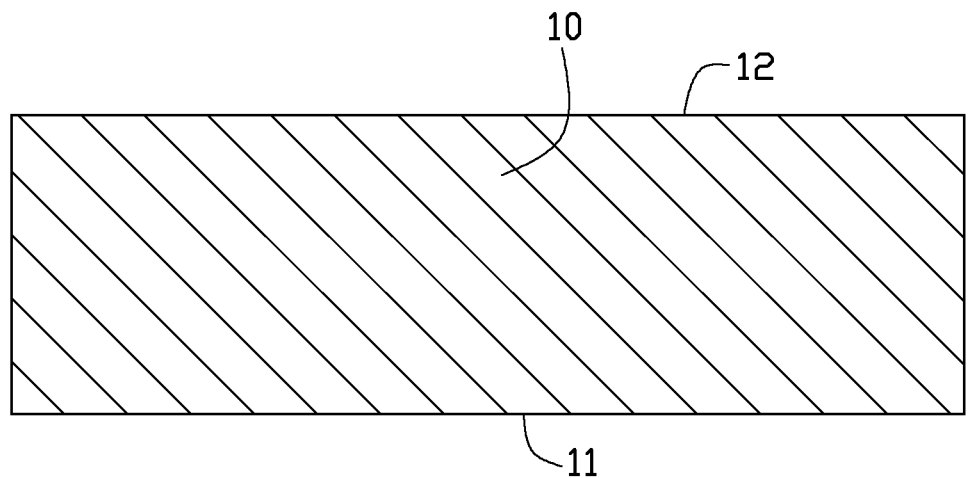
FIGS. 2-6 show successive stages of a fabrication method for the anti-flare lens of FIG. 1.

A mold core blank 10 is provided, as shown in FIG. 2. The mold core blank 10 includes a top surface 12 and a bottom surface 11.

Figure 3:
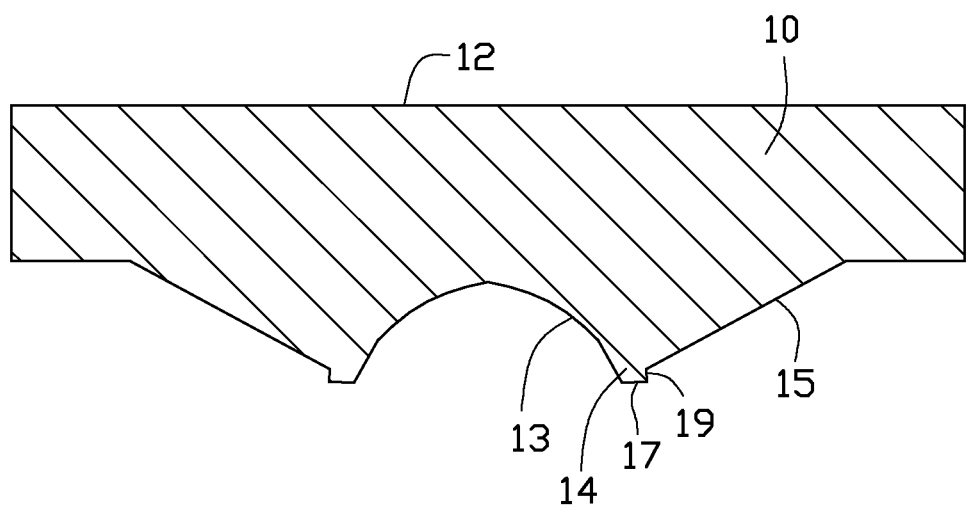

The bottom surface 11 of the molding blank 10 is roughly processed, thus forming a first to-be-processed surface portion 15, a second to-be-processed surface portion 13, and an annular surface portion 17, referring to FIG. 3. The second surface portion 13 is positioned at the center of the molding blank 10. The first surface portion 15 surrounds the second surface portion 13. The annular surface portion 17 is located between the second surface portion 13 and the first surface portion 15, and connects the second surface portion 13 and the first surface portion 15.

In the present embodiment, the mold core blank 10 is cylindrical. The bottom surface 11 is flat. The second surface portion 13 is substantially spherical. The first surface portion 15 is oblique relative to the top surface 12. The annular surface portion 17 includes a third to-be-processed surface 19 connected with the first surface portion 15. The third surface 19 is substantially perpendicular to the top surface 12. The second surface portion 13, the annular surface portion 17, and the third surface portion 19 cooperatively form an annular protrusion 14. The annular protrusion 14 is machined to form a smooth transition surface 27 connecting the second molding surface 23 and the first molding surface 25 in a later process (referring to FIG. 5; described later).

Figure 4:
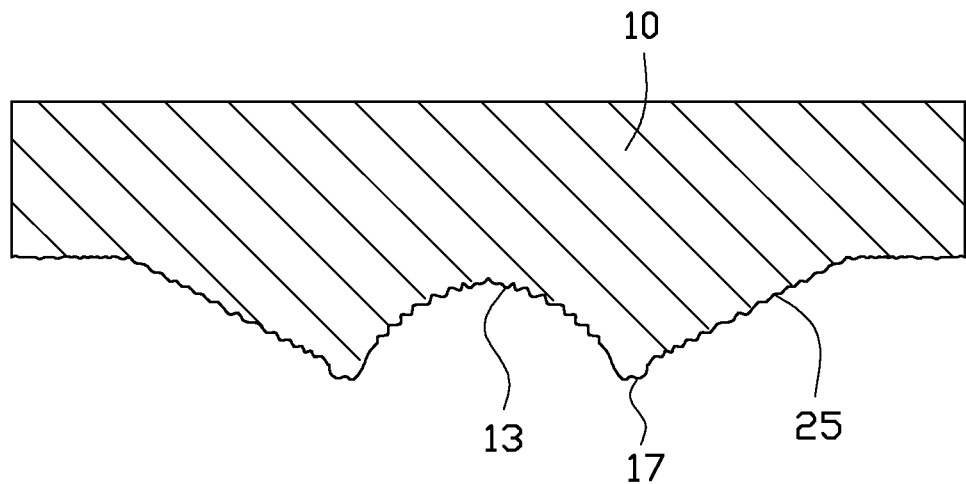

The first surface portion 15, the second surface portion 13, and the annular surface portion 17 are roughened. The first surface portion 15 is roughened to form the first molding surface 25, as shown in FIG. 4. The first molding surface 25 forms an optically inactive part of the lens.

In the present embodiment, the first surface portion 15, the second surface portion 13, and the annular surface portion 17 are processed by sandblasting, thus roughening the second surface portion 13, the first surface portion 15, and the annular surface portion 17. The roughened first molding surface 25 decreases light through the optically inactive part 55 of the lens 50. In other embodiments, in this step, only the first surface portion 15 is roughened.

Figure 5:
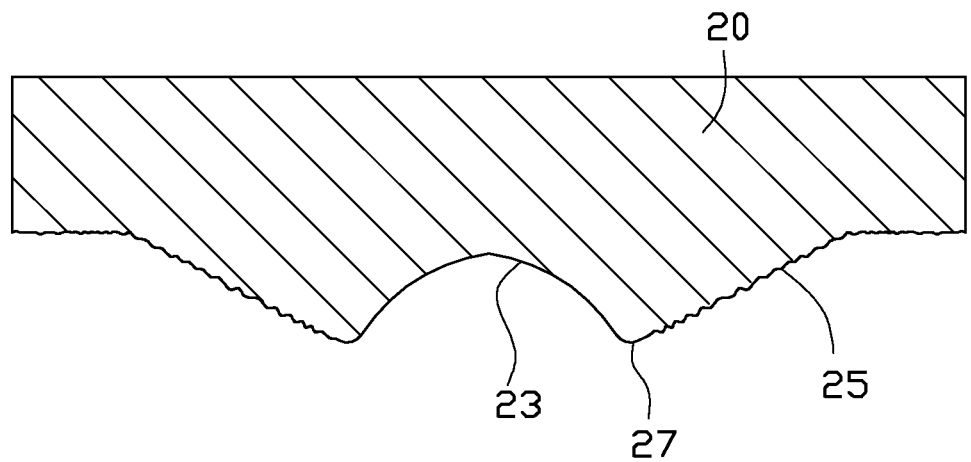

The second surface portion 13 and the annular surface portion 17 are accurately machined, thus obtaining a mold core 20 for making the lens, as shown in FIG. 5.

The second surface portion 13 is processed to form a second molding surface 20, and the annular surface portion 17 is machined to form a transition surface 27, which smoothly connects the second molding surface 20 and the first molding surface 25. The second molding surface 20 and the transition surface 27 are smooth surfaces.

Figure 6:
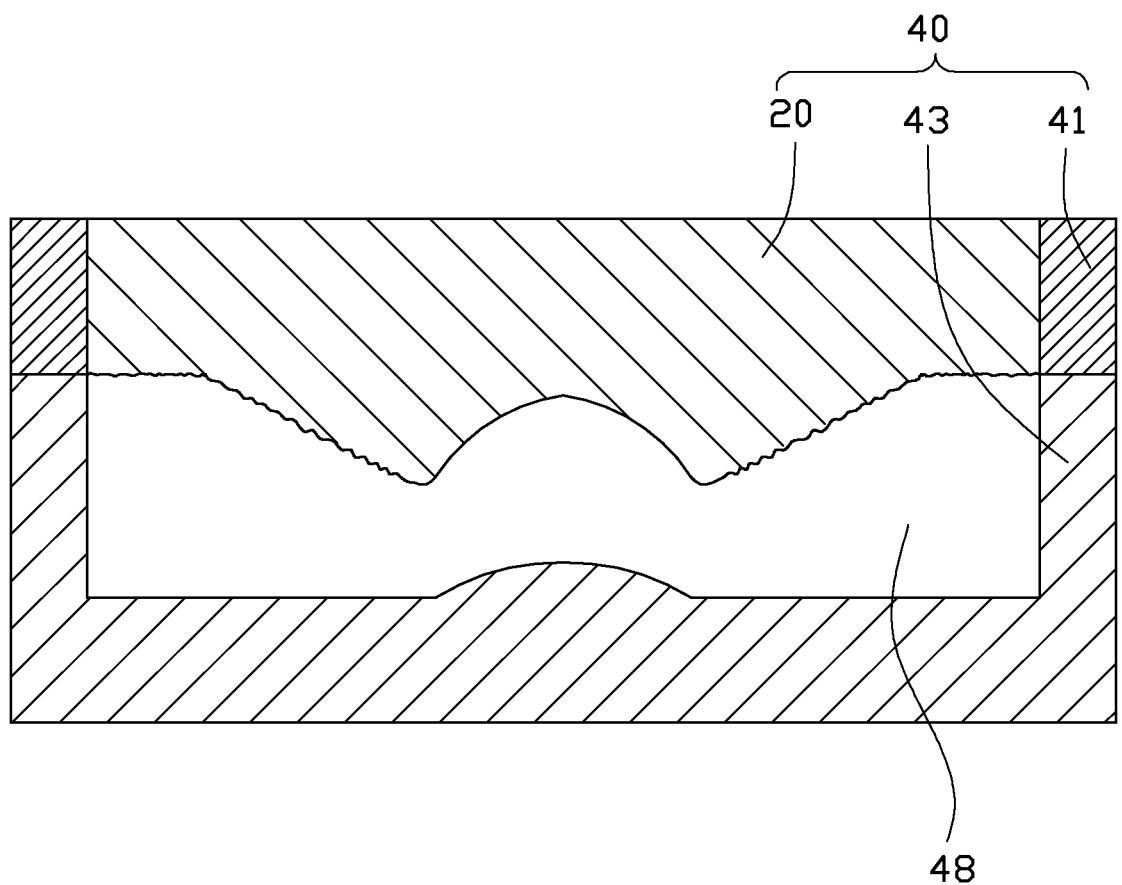

Referring to FIG. 6, the lens is formed by injection molding using a mold 40 having the mold core 20.

The mold 40 includes a male mold 41, a female mold 43, and the mold core 20. The male mold 41, the female mold 43, and the mold core 20 cooperatively define a cavity 48. Molten material is fed into the cavity 48 and then cooled, thus forming the lens.

The lens 50 is removed from the mold 40, thus obtaining the lens 50.

While various embodiments have been described, it is to be understood that the disclosure is not limited thereto. To the contrary, various modifications and similar arrangements (as would be apparent to those skilled in the art), are also intended to be covered. Therefore, the scope of the appended claims should be accorded the broadest interpretation so as to encompass all such modifications and similar arrangements.

What is claimed is:

1. A method for making a mold for forming an anti-flare lens, the lens including an optically active part and an optically inactive part surrounding the optically active part, the method comprising:

providing a mold core blank having a bottom surface and a top surface, machining the bottom surface into a first surface portion, a second surface portion, and an annular surface portion, the second surface portion being located at a center of the mold core blank, the first surface portion surrounding the second surface portion, the annular surface portion being located between the second surface portion and the first surface portion, the annular surface portion connecting the second surface portion and the first surface portion;

roughening the first surface portion to form a roughened molding surface for forming the optically inactive part;

precisely machining the second surface portion to form a smooth molding surface for forming the optically active part; and precisely machining the annular surface to form a smooth transition surface, which smoothly connects the smooth molding surface to the roughened molding surface.

2. The method of claim 1, wherein the mold core blank is cylindrical, and further comprises a cylindrical side surface connected between the top surface and the bottom surface.

3. The method of claim 1, wherein the annular surface portion, the first surface portion, and the second surface portion cooperatively form an annular protrusion.

4. The method of claim 1, wherein the annular surface portion includes a third surface substantially perpendicular to the top surface of the mold core blank before the annular surface is precisely machined.

5. The method of claim 1, wherein the smooth molding surface is substantially spherical.

6. The method of claim 1, wherein the smooth transition surface is curved in cross-section.

7. The method of claim 1, wherein the first surface is roughened by sandblasting.

* * * * *